United States Patent [19]

Piana et al.

[11] Patent Number: 4,764,126

[45] Date of Patent: Aug. 16, 1988

[54] CABLE TERMINAL WITH ROTATABLE MARKER

[75] Inventors: Ivana Piana; Silvano Piana, both of Genoa, Italy

[73] Assignee: Grafoplast S.p.A., Italy

[21] Appl. No.: 64,525

[22] Filed: Jun. 22, 1987

[30] Foreign Application Priority Data

Jul. 2, 1986 [IT] Italy .............................. 12505 A/86

[51] Int. Cl.[4] ............................................ H02G 15/02

[52] U.S. Cl. .................................................... 439/491

[58] Field of Search ............... 439/488, 489, 490, 491, 439/315

[56] References Cited

U.S. PATENT DOCUMENTS 2,503,677 4/1950 McHenry et al. .................. 439/490

FOREIGN PATENT DOCUMENTS 3107083 3/1982 Fed. Rep. of Germany .

1468859 1/1967 France .

2477330 9/1981 France .

0280952 5/1952 Switzerland ........................ 439/491

0438444 12/1967 Switzerland ........................ 439/491

*Primary Examiner*—John McQuade

*Attorney, Agent, or Firm*—Jacobs & Jacobs

[57] ABSTRACT

An electric cable terminal includes a transparent plastic body rotatable about a metal tubular socket in which an electric cable is inserted. The body includes a holder having a recess in which a set of marking elements are inserted. The marking elements are visible through and protected by the transparent holder.

4 Claims, 1 Drawing Sheet

CABLE TERMINAL WITH ROTATABLE MARKER

BACKGROUND OF THE INVENTION

1. Field of the Invention

This invention covers an electric cable terminal with a recessed body for marking elements rotatable with respect to a metal tip (plug).

2. Description of Related Art

Terminals for electric cables, used to connect cables to machines, equipment and electric instruments are well known. They substantially comprise an insulating body, usually in plastic material, partially surrounding the insulated end of the cable and a metal tip (plug) receiving the bare conductor, in which this tip acts as a plug penetrating inside a fixed bush of the equipment receiving or transmitting electric current or signals.

The terminal assembly is generally obtained by injection molding of the plastic body on the metal plug.

As marking of cables was developed for their better identification during installation, maintenance and inspection, cables are either directly marked or their terminal is provided with a sleeve marker.

Several techniques are known for wire marking, while several techniques are also known for marking of terminals and specific reference is made hereinafter to the latter techniques.

It is well known that the French Pat. No. 1,468,859 for cable marking, comprises a terminal having in its body an extension or bar on which marking elements or rings are mounted. This extension is provided at one end with a tooth to prevent the marking elements from slipping off.

This known terminal has two main drawbacks. The first drawback is that the marking elements are not protected, easily become dirty and may become illegible after some time. The second drawback is that the marking elements cannot be rotated with respect to the cable. After assembly of the terminal and its fastening on the cable, the marking elements can be either on one side or even at the bottom of the cable so that it would be impossible to introduce the marking elements or read the same after connection. The latter drawback is particularly felt for the connection of large-sized and rigid cables and since there is a direct mechanical connection between the plug, body and extension of the terminal, the position of the extension cannot be changed after its installation unless the cable is twisted.

Recently a terminal is also known, according to the French Pat. No. 2,477,330 and corresponding German Pat. No. 3,107,083, by which a sleeve marker extension or bar is inserted and mounted inside a hole in the terminal body. According to this known solution the terminal can be used with or without marking elements, but when it is used with the marking elements it has the same drawbacks as the terminal of the already mentioned French Pat. No. 1,468,859.

When using the marking elements the cost of the terminal will obviously be higher since it comprises several separate components which have to be obtained from individual molds.

SUMMARY OF THE INVENTION

Objects of the Invention

The aim of this invention is to provide a terminal with a marker extension protecting the marking elements so that they are always legible, so that the marker sleeve can be rotated with respect to the metal plug fixed to the cable, and so that by rotating the marker extension marking may be performed easily, while allowing the marking elements to be read after connection.

Features of the Invention

This aim is reached by the fact that the marker extension or sleeve has a recess in which the marking elements are introduced, and by the fact that the terminal body is made of a soft, flexible and transparent plastic, thus allowing for the marking elements to be read through the recess. After molding the insulated plastic body it is detached from the metal plug and can be rotated, thus allowing also for rotation of the recessed sleeve.

Incidentally it should be noted that in the known terminals according to the above mentioned patents, the extension or bar receiving and bearing the marking elements is thin and narrow and must therefore be in hard rigid material to allow for installation of the marking elements while preventing deformation. Consequently the whole terminal body is in hard, rigid material, generally in hard rigid plastic. The body of the known terminals is generally in non-transparent plastic, since the marking elements are located outside the supporting extension.

It should also be noted that in the known terminals the portion of the metal plug which is incorporated in the plastic body is only slightly flaring to ensure connection with the plug body, only if this body is in hard, rigid and strong plastic.

BRIEF DESCRIPTION OF THE DRAWINGS

The invention in question is illustrated in its practical implementation in the enclosed drawings in which.

DETAILED DESCRIPTION OF THE PREFERRED EMBODIMENTS

Figure 1:
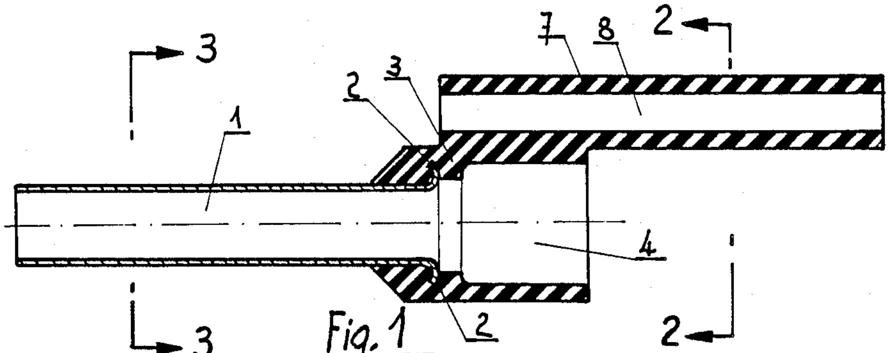
FIG. 1 is a longitudinal axial section view of the terminal according to this invention.
Figure 2:
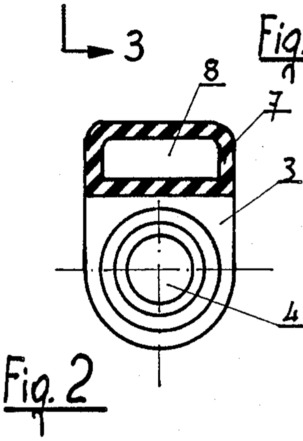
FIG. 2 is a sectional view taken on line 2—2 of FIG. 1.
Figure 3:
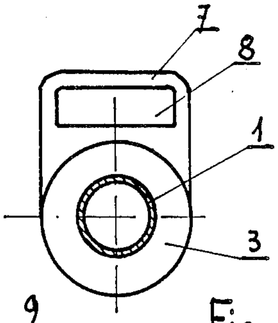
FIG. 3 is a sectional view taken on line 3—3 of FIG. 1.

With reference to the above illustrations, 1 refers to a tubular-shaped terminal-conducting metal plug of the terminal, one end of this plug being surrounded by a body 3 of the terminal, featuring a large external 180° curved welt or flange 2. The body 3 surrounding the shaped end of the plug features an axial boring 4 through which conductor 6 and cable 5 pass and laterally features a recessed holder 7 provided with a longitudinal boring or recess 8, which receives and protects marker elements 9 forming the marking, which in this case are plastic marker rings, already generally used for cable marking according to the known installation practice.

According to this invention, the material forming the body 3 and the marker holder 7 is in soft, elastic and transparent material and in general in soft, flexible and transparent plastic. Consequently the known body 3, together with the marker holder 7, obtained by injection molding around the flange 2 at the tip of the plug 1, can be easily detached from the plug by small reciprocal rotary movements, because of its soft and elastic nature. The body and the holder can rotate with respect to the plug fixed to the cable, so as to reach the best position for marking and reading of the marking.

The axial slipping of the plug from the body and vice versa is prevented by the wide flange 2 at the end of the plug.

The transparency of the material forming the body and the holder enables reading of the marking elements placed in the recess and protected by it.

The soft and flexible nature of plastic is ideal to allow the marking elements to be also introduced in the recess and to keep them in place.

Figure 4:
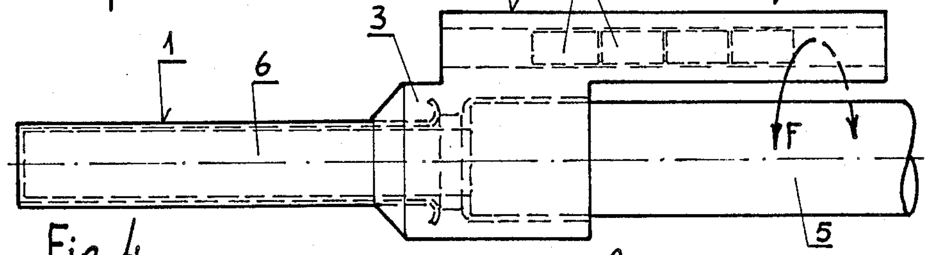
FIG. 4 is a front view of the terminal complete with the marking elements mounted on a cable.
Figure 5:
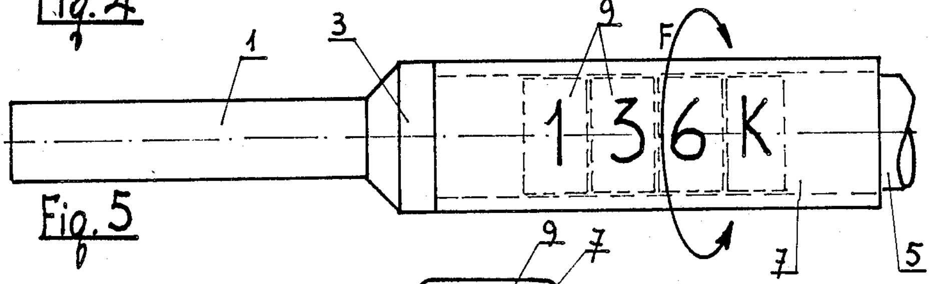
FIG. 5 is a top view of the terminal illustrated in FIG. 4.
Figure 6:
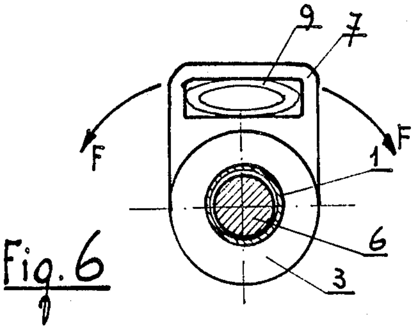
FIG. 6 is an end view from the right side of the terminal illustrated in FIG. 4.

FIGS. 4, 5 and 6 illustrate the terminal complete with marking elements and mounted on the cable 5 having conductor 6. Obviously the plug 1 is fixed to the bare conductor 6, while the body with the holder can be rotated in either direction of the double-headed arrow F so as to be conveniently positioned with respect to the plug and the cable.

For exemplification purposes the above Figures show the marking 136 K consisting of single marker rings 9 close to one another inside the recess 8.

We claim:

1. An electrical cable terminal assembly, comprising:

(A) an elongated, hollow, electrically-conducting plug having an internal socket extending along a longitudinal axis, said socket being dimensioned for electrically receiving an electrical conductor of an electrical cable inserted into the plug through one end thereof;

(B) a soft, flexible, transparent material, electrically-insulating body mounted at said one end for rotation in either circumferential direction about said longitudinal axis, said body including (i) a bore coaxial with the socket, said bore being dimensioned for receiving the electrical cable during insertion of the conductor into the socket, (ii) an elongated hollow holder having transparent walls bounding an internal recess extending along a radially offset axis which is generally parallel to said longitudinal axis, said recess being dimensioned for interiorly receiving cable marking elements arranged lengthwise along the offset axis, said cable marking elements bearing indicia for identifying the cable, (a) said holder being integral with, and of the same transparent material as, the body to enable the indicia to be visible through, and protected by, said transparent walls, and (b) said holder being mounted for joint rotation with the body to enable the indicia to be rotated about said longitudinal axis to a desired position to facilitate viewing of the marking elements; and (C) means at said one end of the plug for preventing relative movement along said longitudinal axis between the body and the plug while allowing said rotation to the desired position.

2. The assembly as recited in claim 1, wherein each cable marking element is a ring frictionally received in the recess.

3. The assembly as recited in claim 1, wherein said means at said one end of the plug is an annular flange having a curved cross-section.

4. The assembly as recited in claim 1, wherein said body is constituted of an injection-molded, synthetic plastic material, and wherein said plug is constituted of a metal material.

* * * * *